US012365014B2

(12) United States Patent
AlTunisi

(10) Patent No.: US 12,365,014 B2
(45) Date of Patent: Jul. 22, 2025

(54) ACOUSTIC DUSTER

(71) Applicant: Saudi Arabian Oil Company, Dhahran (SA)

(72) Inventor: Ahmed Mohammed AlTunisi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/536,801

(22) Filed: Dec. 12, 2023

(65) Prior Publication Data

US 2024/0216963 A1 Jul. 4, 2024

Related U.S. Application Data

(60) Provisional application No. 63/477,445, filed on Dec. 28, 2022.

(51) Int. Cl.
*B08B 13/00* (2006.01)
*B08B 7/02* (2006.01)

(52) U.S. Cl.
CPC .................................... *B08B 7/026* (2013.01)

(58) Field of Classification Search
None
See application file for complete search history.

(56) References Cited

U.S. PATENT DOCUMENTS 3,693,401 A 9/1972 Purt et al.
4,279,142 A 7/1981 Mcintyre
4,462,244 A 7/1984 Lee
4,489,590 A 12/1984 Hadden
4,590,789 A 5/1986 Kunze
5,170,148 A 12/1992 Duggan et al.
(Continued)

FOREIGN PATENT DOCUMENTS

CN 110988274 A 4/2020
CN 111033252 A 4/2020
(Continued)

OTHER PUBLICATIONS

"MSA's Revolutionary TruCal Gas Sensor Technology", https://us.msasafety.com/trucal, Accessed Mar. 16, 2021, 4 pages.
(Continued)

*Primary Examiner* — Eric W Golightly
(74) *Attorney, Agent, or Firm* — DINSMORE & SHOHL LLP

(57) ABSTRACT

A self-cleaning sensor guard is provided. The guard may comprise an acoustic duster housing, a dust guard, a proximity sensor, a phase-enabled controller, and an ultrasonic cleaning source. The dust guard may be positioned to impede passage of ambient particulates into the acoustic duster housing. The proximity sensor may be positioned to generate a dust detection signal that is indicative of the presence of particulates on the dust guard. The ultrasonic cleaning source may be oriented to direct multi-phase and multi-frequency ultrasonic cleaning waves towards the dust guard. The phase-enabled controller may be programmed to drive the ultrasonic cleaning source, at least partially in response to the dust detection signal, by superimposing a first acoustic signal and a second acoustic signal.

25 Claims, 3 Drawing Sheets

(56) References Cited

U.S. PATENT DOCUMENTS

| | | | |
|---|---|---|---|
| 5,523,744 | A | 6/1996 | Wieser |
| 5,611,620 | A | 3/1997 | Wantz |
| 5,670,946 | A | 9/1997 | Ellwood et al. |
| 6,015,230 | A | 1/2000 | Wantz et al. |
| 6,423,962 | B1 | 7/2002 | Pepper |
| 6,640,608 | B2 | 11/2003 | Pepper et al. |
| 6,741,181 | B2 | 5/2004 | Skaggs |
| 6,769,285 | B2 | 8/2004 | Schneider et al. |
| 6,803,853 | B2 | 10/2004 | Schneider et al. |
| 7,225,661 | B2 | 6/2007 | Hong et al. |
| 7,401,493 | B2 | 7/2008 | Forrest |
| 7,581,425 | B2 | 9/2009 | Forrest |
| 7,587,926 | B2 | 9/2009 | Ackerman |
| 8,353,625 | B1 | 1/2013 | Feiter et al. |
| 8,454,228 | B2 | 6/2013 | Skinner |
| 8,973,211 | B2 | 3/2015 | Rote et al. |
| D779,352 | S | 2/2017 | Scarder |
| 11,614,429 | B1 | 3/2023 | Altunisi et al. |
| 2008/0224847 | A1 | 9/2008 | Pepper |
| 2020/0309647 | A1 | 10/2020 | Smedsrud et al. |
| 2021/0262997 | A1 | 8/2021 | Alsalman et al. |
| 2022/0211230 | A1 * | 7/2022 | Collins ..................... A47L 9/02 |

FOREIGN PATENT DOCUMENTS

| | | | |
|---|---|---|---|
| CN | 211978855 | U | 11/2020 |
| EP | 16351 | A1 | 10/1980 |
| JP | 2001133367 | A | 5/2001 |
| KR | 101995993 | B1 | 7/2019 |

OTHER PUBLICATIONS

Abubakar et al., "Environmental dust repelling from hydrophobic and hydrophilic surfaces under vibrational excitation", Scientific Reports, vol. 10, 14346, 2020 , 19 pages.

* cited by examiner

ACOUSTIC DUSTER

CROSS-REFERENCE TO RELATED APPLICATION

This application claims priority to U.S. Provisional Application No. 63/477,445, filed Dec. 28, 2022, the disclosure of which is incorporated herein by reference in its entirety.

TECHNICAL FIELD

The present disclosure relates to sensor technology, and more particularly, to sensor protection technology.

BACKGROUND

Challenging environments, such as deserts or industrial settings, may include a high concentration of airborne particles like sand or dust. These particles can accumulate on sensitive equipment, including sensors, and compromise their performance. Accordingly, there is a need for an acoustic duster to prevent or remove the buildup of sand or dust on the sensors or other devices.

SUMMARY

According to the subject matter of the present disclosure, an acoustic duster is provided in the form of a self-cleaning sensor guard comprising an acoustic duster housing, a dust guard, a proximity sensor, a phase-enabled controller, an ultrasonic cleaning source, and in some embodiments, a vibration motor. The present disclosure is also directed to gas detector assemblies incorporating self-cleaning sensor guards.

In accordance with one embodiment of the present disclosure, a self-cleaning sensor guard comprises an acoustic duster housing, a dust guard, a proximity sensor, a phase-enabled controller, and an ultrasonic cleaning source. The acoustic duster housing may comprise a gas detector coupling end and an ambient air end comprising an ambient air aperture. The dust guard may be positioned to impede passage of ambient particulates into the acoustic duster housing through the ambient air aperture of the acoustic duster housing. The proximity sensor may be positioned to generate a dust detection signal that is indicative of the presence of particulates on the dust guard. The ultrasonic cleaning source may be oriented to direct multi-phase and multi-frequency ultrasonic cleaning waves towards the dust guard. The phase-enabled controller may be programmed to drive the ultrasonic cleaning source, at least partially in response to the dust detection signal, by superimposing a first acoustic signal $A_1(f_1, \phi_1)$ and a second acoustic signal $A_2(f_2, \phi_2)$, where $f_1$ is the frequency of the first acoustic signal $A_1$, $\phi_1$ is the phase of the first acoustic signal $A_1$,$f_2$ is the frequency of the second acoustic signal $A_2$, $\phi_2$ is the phase of the second acoustic signal $A_2$, and $f_1 \approx 2f_2$, $\phi_1 \approx \phi_2 \pm 90°$.

In accordance with another embodiment of the present disclosure, a gas detector assembly comprises a gas detector, a detector adaptor, and the above-described self-cleaning sensor guard. To facilitated proper coupling and sensing, the detector adaptor may comprise a gas passage body portion, a gas detector coupling end, and a self-cleaning sensor guard coupling end.

Although the concepts of the present disclosure are described herein with primary reference to gas sensors, it is contemplated that the concepts will enjoy applicability to any technical field where sensitive instruments need to operate in environments where ambient particulates might interfere with the operation of the instrument.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
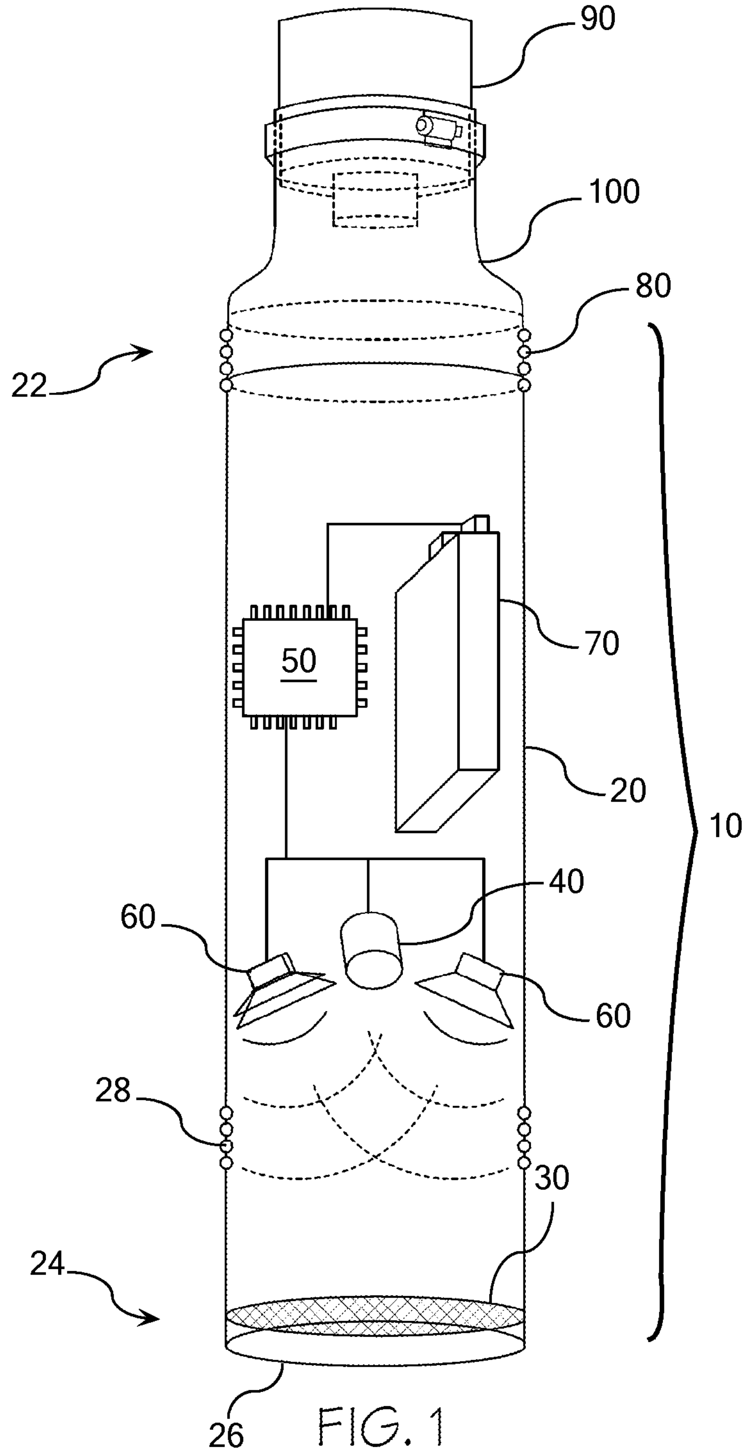
FIG. 1 illustrates a self-cleaning sensor guard according to one embodiment of the present disclosure.

Referring initially to FIG. 1, a self-cleaning sensor guard 10 is provided comprising an acoustic duster housing 20, a dust guard 30, a proximity sensor 40, a phase-enabled controller 50, and an ultrasonic cleaning source 60. The acoustic duster housing 20 comprises a gas detector coupling end 22 and an ambient air end 24 comprising an ambient air aperture 26. The dust guard 30 is positioned to impede passage of ambient particulates into the acoustic duster housing 20 through the ambient air aperture 26 of the acoustic duster housing 20. The proximity sensor 40 is positioned to generate a dust detection signal that is indicative of the presence of particulates on the dust guard 30. The ultrasonic cleaning source 60 is oriented to direct multi-phase and multi-frequency ultrasonic cleaning waves towards the dust guard 30. The phase-enabled controller 50 is programmed to drive the ultrasonic cleaning source 60, at least partially in response to the dust detection signal, by superimposing a first acoustic signal $A_1(f_1, \phi_1)$ and a second acoustic signal $A_2(f_2, \phi_2)$, where $f_1$ is the frequency of the first acoustic signal $A_1$, $\phi_1$ is the phase of the first acoustic signal $A_1$,$f_2$ is the frequency of the second acoustic signal $A_2$, $\phi_2$ is the phase of the second acoustic signal $A_2$, and $$f_1 \approx 2f_2$$

$$\phi_1 \approx \phi_2 \pm 90°.$$

Figure 2:
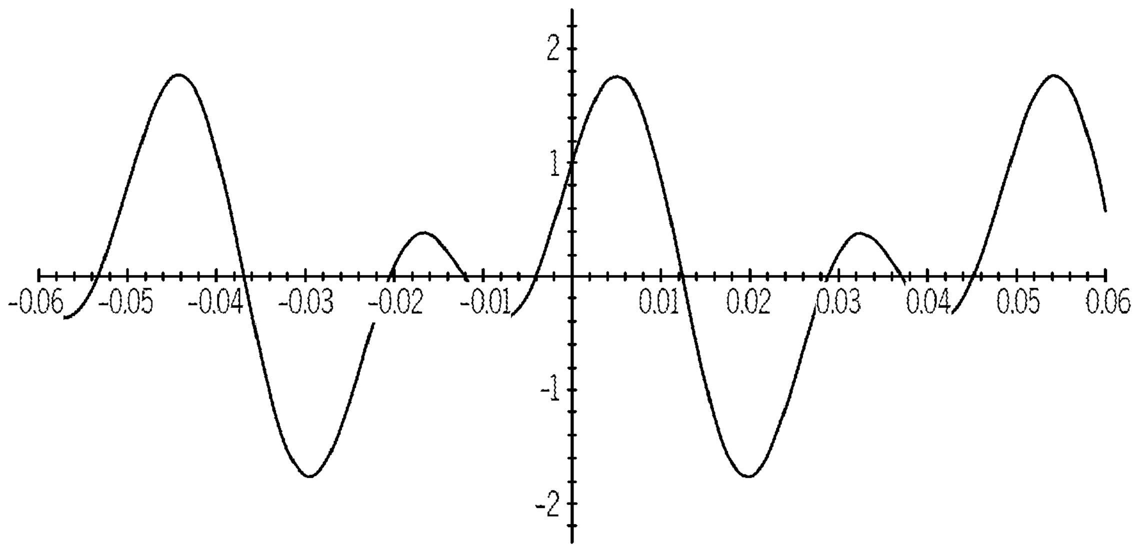
FIG. 2 illustrates superimposed acoustic signals according to the subject matter of the present disclosure.

FIG. 2 illustrates superimposed acoustic signals according to the above-noted relation, as can be generated by the ultrasonic cleaning source 60, where the first signal amplitude equals the second signal amplitude, the first signal frequency $f_1$ is 20 Hz, the second signal frequency $f_2$ is 40 Hz, and the two acoustic signals are 90 degree out of phase. As is illustrated in FIG. 2, the superimposed acoustic signal is asymmetric. Further, the superimposed acoustic signal has a greater amplitude than the either of the first or the second acoustic signals $A_1$, $A_2$. More generally, the frequency of the first acoustic signal $f_1$ may be between about 30 Hz and about 50 Hz and the frequency of the second acoustic signal $f_2$ may be between about 15 Hz and about 25 Hz.

Referring back to FIG. 1, the phase-enabled controller 50 is programed to drive the ultrasonic cleaning source 60. In embodiments, the phase-enabled controller 50 may be programed to drive the ultrasonic cleaning source 60 at a fixed interval schedule. For example, and not by way of limitation, the aforementioned fixed interval dusting may be activated during periods of particularly high particulate contamination, such as during sand storms, to help minimize dust accumulation or particulate contamination. In some embodiments, the phase-enabled controller 50 may be programed to initiate and cease driving the ultrasonic cleaning source 60 in response to the dust detection signal, i.e., initiate dusting when the dust detection signal shows a significant amount of dust accumulating on the dust guard 30, and cease dusting when the dust detection signal shows significant reduction of dust on the dust guard 30, or otherwise returns to normal.

In embodiments, the self-cleaning sensor guard 10 may further include a vibration motor 70 that is vibrationally-coupled to the dust guard 30, through the acoustic duster housing 20, and a vibration controller that is programmed to drive the vibration motor 70 at least partially in response to the dust detection signal. The vibration controller may be provided as a separate controller or may be integrated with the phase-enabled controller 50. In some embodiments, the vibration controller may be programed to drive the vibration motor 70 at a fixed interval schedule. In some embodiments, the vibration controller, like the phase-enabled controller 50, may be programed to initiate and cease driving the vibration motor 70 in response to the dust detection signal.

In embodiments, the vibration motor 70 may be a piezoelectric motor, which may generate sonically or ultrasonically induced vibration. The generated vibration may travel through the acoustic duster housing 20, causing particulates on the dust guard 30 to be released and may help breakdown particulates accumulated on the dust guard 30. The aforementioned vibration can be particularly effective when dust or other particulates have accumulated on wet surfaces of the sensor guard, due to humid weather. To further address particulate buildup and facilitate cleaning under humid conditions, the dust guard 30 may comprise a hydrophobic coating to ease removal of particulates from the dust guard 30 upon activation of the vibration motor 70.

Figure 3:
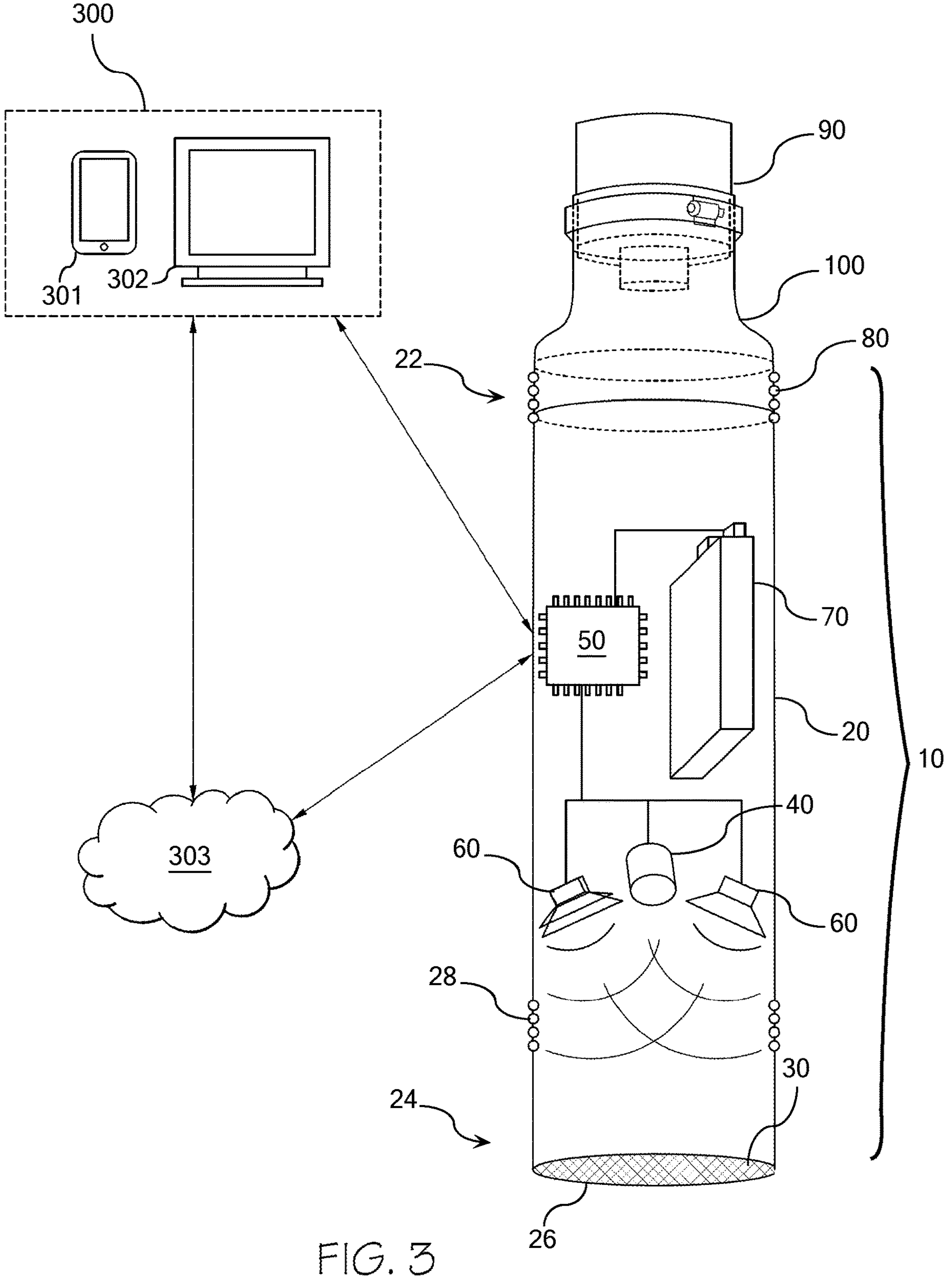
FIG. 3 illustrates a self-cleaning sensor guard according to another embodiment of the present disclosure.

In embodiments, the dust guard 30 may be secured to the ambient air end 24 of the acoustic duster housing 20 in a configuration that is flush with the ambient air end 24 as shown in FIG. 3, or recessed relative to the ambient air end 24 as shown in FIG. 1. The dust guard 30 may comprise a mesh screen, a glass fiber filter, or a polyester filter. The dust guard 30 may further comprise a hydrophobic coating on the aforementioned screen/filters. In embodiments, the hydrophobic coating may comprise fluoropolymers, oxide polystyrene composites, fluorinated oxides, nanotubes, or nanoparticles. The hydrophobic coating may create a non-adhesive surface that repels water droplets in humid air and decreases surface tension such that the dust guard 30 may be maintained a dry surface to prevent particulate buildup on the dust guard 30.

The proximity sensor 40 is positioned to generate a dust detection signal that is indicative of the presence of particulates on the dust guard 30. The proximity sensor 40 may be configured to generate the dust signal that indicates an airflow obstruction at the dust guard 30 and transmit the dust detection signal to the phase-enabled controller 50 or the vibration controller. In embodiments, the proximity sensor 40 may comprise an ultrasonic sensor, a radar sensor, a camera, or any other conventional or yet-to-be developed technology that can be used to monitor the presence and accumulation of particulates on the dust guard 30.

The gas detector coupling end 22 of the acoustic duster housing 20 may be configured to engage with a gas detector assembly. To this end, the gas detector coupling end 22 may comprise detector adaptor connection threads 80 as illustrated in FIG. 1.

In embodiments, the acoustic duster housing 20 may further comprise as dust guard connection thread 28 as illustrated in FIG. 1. The threaded portion may be disposed on the acoustic duster housing 20 such that a user may disassemble the acoustic duster housing 20 to access to the components inside, such as the dust guard 30, the proximity sensor 40, the ultrasonic cleaning source 60, the phase-enabled controller 50, the vibration controller, and the vibration motor 70.

Referring to FIG. 3, the self-cleaning sensor guard 10 may further comprise an external controller 300 in communication with the phase-enabled controller 50. The self-cleaning sensor guard 10 may further comprise a vibration motor 70 that is vibrationally-coupled to the dust guard 30, through the acoustic duster housing 20, and a vibration controller that is programmed to drive the vibration motor 70 at least partially in response to a vibration control signal from the external controller 300. The external controller 300 may be a mobile device, a smart phone 301, or a computer 302.

In embodiments, the self-cleaning sensor guard 10 may further comprise a user interface residing with the external controller 300, and the external controller 300 may be programmed to drive the phase-enabled controller 50 or the vibration controller by generating a self-cleaning command in response to input from a user at the user interface. The external controller 300 may communicate with the phase-enabled controller 50 or the vibration controller through a network 303 or a control circuit. The external controller 300 may communicate with the phase-enabled controller 50 or the vibration controller wirelessly or through a hard wired connection. The wireless communications may be released through a wireless transmitter, listener transmitter, Bluetooth, LTE transmitter, WirelessHART, ISA100.11a, or any other conventional or yet-to-be developed communication technology.

In embodiments, the self-cleaning sensor guard 10 may further comprise a control system gateway and the external controller 300 may be programmed to communicate with the phase-enabled controller 50 or the vibration controller wirelessly through the control system gateway. In embodiments, the self-cleaning sensor guard 10 may further comprise an external display that resides with the external controller 300, and the external controller 300 may be in further communication with the proximity sensor 40 and may be programmed to display a degree of particulate accumulation on the dust guard 30 at the external display. In embodiments, the self-cleaning sensor guard 10 may further comprise a transmitter terminal and the external controller 300 may be programmed to communicate with the phase-enabled controller 50 through the transmitter terminal.

Power for driving the phase-enabled controller 50, the proximity sensor 40, the ultrasonic cleaning source 60, or the vibration motor 70 may be supplied directly from an external or integrated power supply, which may comprise a wired or wireless connection to an external power supply, or internal or external batteries.

Although FIGS. 1 and 3 illustrates the dust guard 30 in a flush, or slightly recessed configuration, with the proximity sensor 40 and ultrasonic cleaning source 60 in a downward-facing configuration, it is contemplated that, in some embodiments, the dust guard 30 may recessed to a greater extent, and the proximity sensor 40 and the ultrasonic cleaning source 60 may be positioned in an upward facing configuration, between the dust guard 30 and the ambient air aperture 26 of the acoustic duster housing 20.

Referring back to FIG. 1, a gas detector assembly is provided comprising a gas detector 90, a detector adaptor 100, and the above-described self-cleaning sensor guard 10. To facilitated proper coupling and sensing, the detector adaptor 100 may comprise a gas passage body portion, a gas detector coupling end 22, and a self-cleaning sensor guard coupling end.

In embodiments, the gas detector 90 may be configured to engage with a gas detector transmitter. The gas detector coupling end 22 of the detector adaptor 100 may be configured to engage with the gas detector 90. The detector adaptor 100 may comprise a calibration housing fitting at the gas detector coupling end 22 of the detector adaptor 100. The calibration housing fitting may comprise an adjustable ring clamp at the gas detector coupling end 22 of the detector adaptor 100. The self-cleaning sensor guard end of the detector adaptor 100 may be configured to engage with the detector adaptor end of the self-cleaning sensor guard 10. The self-cleaning sensor guard end of the detector adaptor 100 may comprise a threaded portion.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

For the purposes of describing and defining the present invention it is noted that the term "about" is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A self-cleaning sensor guard comprising an acoustic duster housing, a dust guard, a proximity sensor, a phase-enabled controller, and an ultrasonic cleaning source, wherein:

the acoustic duster housing comprises a gas detector coupling end and an ambient air end comprising an ambient air aperture;

the dust guard is positioned to impede passage of ambient particulates into the acoustic duster housing through the ambient air aperture of the acoustic duster housing;

the proximity sensor is positioned to generate a dust detection signal that is indicative of the presence of particulates on the dust guard;

the ultrasonic cleaning source is oriented to direct multi-phase and multi-frequency ultrasonic cleaning waves towards the dust guard; and the phase-enabled controller is programmed to drive the ultrasonic cleaning source, at least partially in response to the dust detection signal, by superimposing a first acoustic signal $A_1(f_1, \phi_1)$ and a second acoustic signal $A_2(f_2, \phi_2)$, where $f_1$ is the frequency of the first acoustic signal $A_1$, $\phi_1$ is the phase of the first acoustic signal $A_1$, $f_2$ is the frequency of the second acoustic signal $A_2$, $\phi_2$ is the phase of the second acoustic signal $A_2$, and $$f_1 \approx 2f_2$$

$$\phi_1 \approx \phi_2 \pm 90°.$$

2. The self-cleaning sensor guard of claim 1, wherein $f_1$ is between about 30 Hz and about 50 Hz, and $f_2$ is between about 15 Hz and about 25 Hz.

3. The self-cleaning sensor guard of claim 1, wherein the phase-enabled controller is programed to drive the ultrasonic cleaning source at a fixed interval schedule.

4. The self-cleaning sensor guard of claim 1, wherein the phase-enabled controller is programed to initiate and cease driving the ultrasonic cleaning source in response to the dust detection signal.

5. The self-cleaning sensor guard of claim 1, wherein the self-cleaning sensor guard further comprises a vibration motor that is vibrationally-coupled to the dust guard, through the acoustic duster housing, and a vibration controller that is programmed to drive the vibration motor at least partially in response to the dust detection signal.

6. The self-cleaning sensor guard of claim 5, wherein the vibration controller is integrated with the phase-enabled controller.

7. The self-cleaning sensor guard of claim 5, wherein the vibration motor comprises a piezoelectric motor.

8. The self-cleaning sensor guard of claim 1, wherein:

the self-cleaning sensor guard further comprises a vibration motor that is vibrationally-coupled to the dust guard, through the acoustic duster housing, and a vibration controller that is programmed to drive the vibration motor at least partially in response to the dust detection signal; and the dust guard comprises a hydrophobic coating to ease removal of particulates from the dust guard upon activation of the vibration motor.

9. The self-cleaning sensor guard of claim 1, wherein the dust guard is secured to the ambient air end of the acoustic duster housing in a configuration that is flush with, or recessed relative to, the ambient air end of the acoustic duster housing.

10. The self-cleaning sensor guard of claim 9, wherein the dust guard comprises a mesh screen, a glass fiber filter, or a polyester filter.

11. The self-cleaning sensor guard of claim 10, wherein the dust guard comprises a hydrophobic coating.

12. The self-cleaning sensor guard of claim 11, wherein the hydrophobic coating comprises fluoropolymers, oxide polystyrene composites, fluorinated oxides, nanotubes, or nanoparticles.

13. The self-cleaning sensor guard of claim 1, wherein the proximity sensor comprises an ultrasonic sensor, a radar sensor, or a camera.

14. The self-cleaning sensor guard of claim 1, wherein the gas detector coupling end of the acoustic duster housing is configured to engage with a gas detector assembly.

15. The self-cleaning sensor guard of claim 14, wherein the gas detector coupling end comprises a threaded portion.

16. The self-cleaning sensor guard of claim 1, wherein the self-cleaning sensor guard further comprises an external controller in communication with the phase-enabled controller.

17. The self-cleaning sensor guard of claim 16, wherein:

the self-cleaning sensor guard further comprises a vibration motor that is vibrationally-coupled to the dust guard, through the acoustic duster housing; and a vibration controller that is programmed to drive the vibration motor at least partially in response to a vibration control signal from the external controller.

18. The self-cleaning sensor guard of claim 16, wherein the self-cleaning sensor guard further comprises a user interface residing with the external controller, and the external controller is programmed to drive the phase-enabled controller by generating a self-cleaning command in response to input from a user at the user interface.

19. The self-cleaning sensor guard of claim 16, wherein the external controller communicates with the phase-enabled controller through a network or a control circuit.

20. The self-cleaning sensor guard of claim 16, wherein the external controller communicates with the phase-enabled controller wirelessly or through a hard wired connection.

21. The self-cleaning sensor guard of claim 16, wherein the self-cleaning sensor guard further comprises a control system gateway and the external controller is programmed to communicate with the phase-enabled controller wirelessly through the control system gateway.

22. The self-cleaning sensor guard of claim 16, wherein the self-cleaning sensor guard further comprises an external display that resides with the external controller, and the external controller is in further communication with the proximity sensor and is programmed to display a degree of particulate accumulation on the dust guard at the external display.

23. The self-cleaning sensor guard of claim 16, wherein the external controller is a mobile device, a smart phone, or a computer.

24. The self-cleaning sensor guard of claim 16, wherein the self-cleaning sensor guard further comprises a transmitter terminal and the external controller is programmed to communicate with the phase-enabled controller through the transmitter terminal.

25. A gas detector assembly comprising a gas detector, a detector adaptor, and a self-cleaning sensor guard, wherein:

the detector adaptor comprises a gas passage body portion, a gas detector coupling end, and a self-cleaning sensor guard coupling end;

the self-cleaning sensor guard comprises an acoustic duster housing, a dust guard, a proximity sensor, a phase-enabled controller, and an ultrasonic cleaning source;

the acoustic duster housing comprises a detector adaptor coupling end and an ambient air end comprising an ambient air aperture;

the dust guard is positioned to impede passage of ambient particulates into the acoustic duster housing through the ambient air aperture of the acoustic duster housing;

the proximity sensor is positioned to generate a dust detection signal that is indicative of the presence of particulates on the dust guard;

the ultrasonic cleaning source is oriented to direct multi-phase and multi-frequency ultrasonic cleaning waves towards the dust guard; and the phase-enabled controller is programmed to drive the ultrasonic cleaning source, at least partially in response to the dust detection signal, by superimposing a first acoustic signal $A_1(f_1, \phi_1)$ and a second acoustic signal $A_2(f_2, \phi_2)$, where $f_1$ is the frequency of the first acoustic signal $A_1$, $\phi_1$ is the phase of the first acoustic signal $A_1$, $f_2$ is the frequency of the second acoustic signal $A_2$, $\phi_2$ is the phase of the second acoustic signal $A_2$, and $$f_1 \approx 2f_2$$

$$\phi_1 \approx \phi_2 \pm 90°.$$

* * * * *